(12) United States Patent
Nyberg et al.

(10) Patent No.: US 8,316,981 B2
(45) Date of Patent: Nov. 27, 2012

(54) VEHICULAR ACTUATOR ARRANGEMENT AND IMPLEMENTATIONS

(75) Inventors: Richard Nyberg, Brooklyn Park, MN (US); James R. Preston, Minneapolis, MN (US)

(73) Assignee: American Gear Products, LLC, Moundsview, MN (US)

( * ) Notice: Subject to any disclaimer, the term of this patent is extended or adjusted under 35 U.S.C. 154(b) by 639 days.

(21) Appl. No.: 12/521,971

(22) PCT Filed: Jun. 13, 2008

(86) PCT No.: PCT/US2008/066977
§ 371 (c)(1),
(2), (4) Date: Jul. 1, 2009

(87) PCT Pub. No.: WO2008/157397
PCT Pub. Date: Dec. 24, 2008

(65) Prior Publication Data
US 2010/0038165 A1 Feb. 18, 2010

Related U.S. Application Data

(60) Provisional application No. 60/944,360, filed on Jun. 15, 2007.

(51) Int. Cl.
*B60K 17/34* (2006.01)
(52) U.S. Cl. .......................... 180/249; 180/248; 180/233
(58) Field of Classification Search .................. 180/249, 180/248, 250, 233
See application file for complete search history.

(56) References Cited

U.S. PATENT DOCUMENTS

| | | | |
|---|---|---|---|
| 4,373,407 A | 2/1983 | Okubo | |
| 5,363,938 A | 11/1994 | Wilson et al. | |
| RE38,012 E | 3/2003 | Ochab et al. | |
| 6,904,992 B2 | 6/2005 | Miguchi | |
| 7,018,317 B2 | 3/2006 | Tweet et al. | |
| 7,243,564 B2 | 7/2007 | Chonan et al. | |
| 7,343,998 B2 | 3/2008 | Morin et al. | |
| 2001/0036879 A1 | 11/2001 | Brown et al. | |
| 2002/0121784 A1 | 9/2002 | Chevalier | |
| 2006/0117878 A1 | 6/2006 | Spurr | |

OTHER PUBLICATIONS

PCT/US08/66977, Sep. 30, 2009, PCT Preliminary Examination Report IPEA/US/416.

*Primary Examiner* — Tashiana Adams
*Assistant Examiner* — Michael Stabley
(74) *Attorney, Agent, or Firm* — Crawford Maunu PLLC

(57) ABSTRACT

A vehicle drive arrangement is controlled with an actuator arrangement. According to an example embodiment, an actuator arrangement includes a rotatable gear having pins thereon that are applied to a latch and rocker arm to selectively engage and lock a vehicle drive system. In some applications, gear is rotated to apply a first pin to move the latch for selective engagement of the vehicle drive system, and to apply the second pin for selective locking of the engagement, during which selective locking the rotation of the first pin does not cause movement of the latch. Other embodiments are directed to vehicle drive systems and vehicles, such as all-terrain vehicles, employing drive systems and an actuator.

22 Claims, 14 Drawing Sheets

Position 1

Position 2

Position after dwell

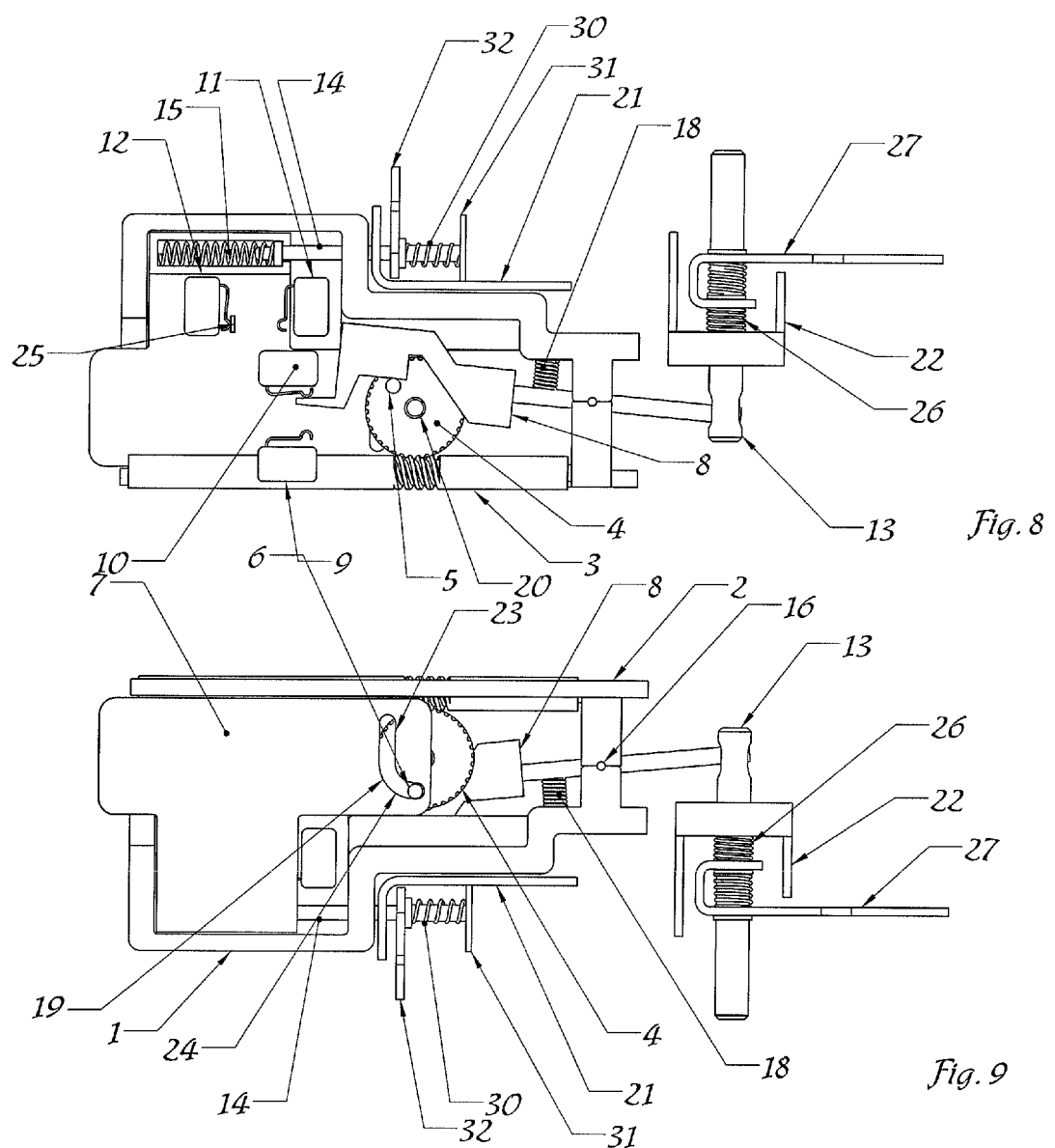

Position 2A

Position 2B

Position 1R

Position 2R

Position 3R

VEHICULAR ACTUATOR ARRANGEMENT AND IMPLEMENTATIONS

RELATED PATENT DOCUMENTS

This patent document is the national stage filing under 35 U.S.C. §371 of International Application No. PCT/US2008/066977 filed on Jun. 13, 2008; which claims benefit under 35 U.S.C. §119 of U.S. Provisional Patent Application Ser. No. 60/944,360, entitled "Actuator Arrangement" and filed on Jun. 15, 2007.

BACKGROUND

Mechanical and electro-mechanical actuators are used to carry out a variety of tasks, ranging from heavy-duty tasks involving relatively high load and/or stress to relatively light duty tasks with various levels of precision. However, for a variety of applications, actuation has been challenging to implement in a reliable manner.

Motor vehicles employ a broad field of applications for which actuators or other movement-based devices have been used extensively. For example, in vehicle drive arrangements, it is often desirable and necessary to move mechanical components to facilitate the engagement, and disengagement, of a variety of systems such as gears, clutches, fluid controls, suspension controls and steering controls. To this end, many actuation-based devices have been extensively employed to effect vehicle control and operation. However, reliable and economical actuation has often been challenging to achieve.

The above and other difficulties have presented challenges to the operation of vehicle components and overall operation of the vehicles in which the components reside.

SUMMARY

The present invention is directed to overcoming the above-mentioned challenges and others related to the types of approaches and implementations discussed above and in other applications. The present invention is exemplified in a number of implementations and applications, some of which are summarized below.

According to an example embodiment, an actuator arrangement includes a latch and rocker arm that respectively engage and lock a vehicle drive system. The latch is coupled to engage the vehicle drive system relative to a translational position of the latch. The latch translates relative to movement of a pin that extends into a slot in the latch. The rocker arm couples to the vehicle drive system to selectively lock the engagement of the vehicle drive relative to a rotational position of the rocker arm about a fulcrum. The arrangement also includes a rotatable gear that rotates in response to a gear input, and first and second pins connected to the rotatable gear. The first pin extends into the slot in the latch (as described above) to engage and move the latch as the rotatable gear rotates. The second pin engages the rocker arm to rotate the rocker arm about the fulcrum as the rotatable gear rotates. A sensor senses the position of the latch for controlling the rotation of the rotatable gear for selective engagement and locking of the vehicle drive.

According to another example embodiment of the present invention, a drive system selectively operates a vehicle in two-wheel drive or four-wheel drive. The system includes a differential to couple power from a power source to drive wheels when engaged in four-wheel drive operation, an actuator arrangement as described above, and a rotational power source to control the rotation of the rotatable gear. The rotational power source thus effects the selective engagement and locking (and unlocking and disengagement) of the differential for operating the vehicle in two-wheel drive (disengaged) or four-wheel drive (engaged).

Another example embodiment is directed to an all-terrain vehicle having an engine, wheels that support and move the vehicle over a surface, and the drive system such as described above. In some embodiments, the vehicle is operated in either two-wheel drive, four-wheel drive, or four wheel drive with locked differential via control by the actuator arrangement.

Various other embodiments are directed to methods, systems and related components as relative to the above-described vehicle drive engagement and locking system and approach.

The above summary of the present invention is not intended to describe each illustrated embodiment or every implementation of the present invention. The figures and detailed description that follow more particularly exemplify these embodiments.

BRIEF DESCRIPTION OF THE DRAWINGS

The invention may be more completely understood in consideration of the detailed description of various embodiments of the invention in connection with the accompanying drawings, in which:

FIGS. 1-9 show views of an actuator arrangement, according to example embodiments of the present invention, in which FIG. 1 shows an overall perspective view, FIG. 2 shows a first side view of a first position, FIG. 3 shows another side view of the first position in FIG. 2, FIG. 4 shows a first side view of a second position, FIG. 5 shows another side view of the second position in FIG. 4, FIG. 6 shows a first side view of a position during dwell, FIG. 7 shows another side view of the position during dwell in FIG. 6, FIG. 8 shows a first side view of a third position, and FIG. 9 shows another side view of the third position in FIG. 8;

FIG. 24 shows an actuator arrangement attached to a differential with mechanical connections, according to another example embodiment of the present invention.

Figure 1:
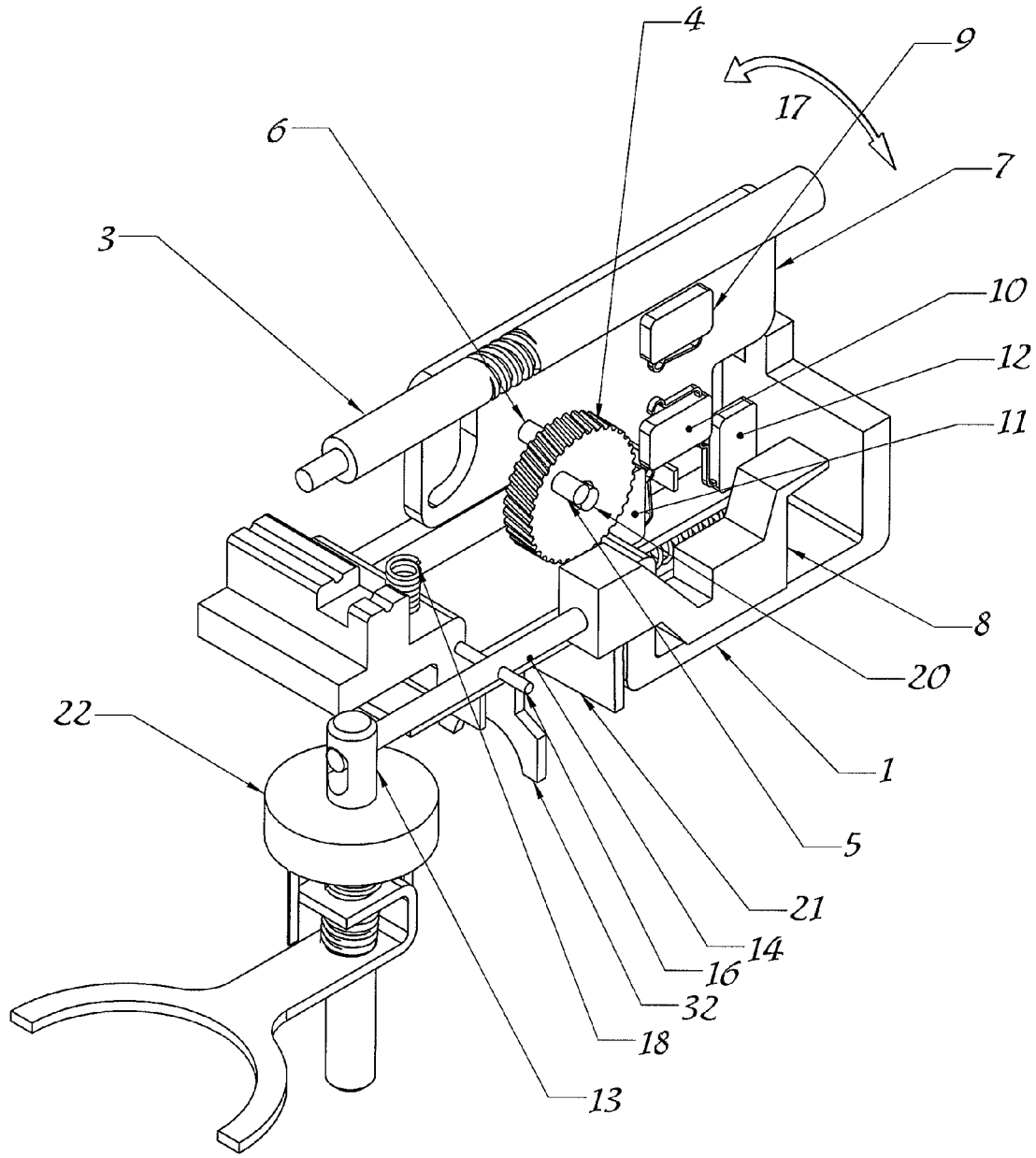

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention as defined by the appended claims.

DETAILED DESCRIPTION

The present invention is believed to be applicable to a variety of different types of actuators and actuator implementations, and has been found to be particularly useful for applications involving the actuation of drive components, such as those implemented in personal vehicles. While the present invention is not necessarily limited to such approaches, various aspects of the invention may be appreciated through a discussion of examples using these and other contexts.

In connection with various example embodiments, an actuator is implemented for selective positioning, such as for controlling the engaging and disengaging of mechanical components. In some embodiments, the actuator includes mechanical actuation components and an electronic controller that controls the components as shown in the figures. For a variety of applications, the actuator is implemented with vehicular systems such as a gear engagement system, or a four-wheel-drive system.

According to another example embodiment of the present invention, a mechanical drive device includes an actuator arrangement to control a drive arrangement for a vehicle. Certain implementations are directed to a mechanical drive device for an all-terrain vehicle or a snowmobile, or for other personal (e.g., one-person or two-person) vehicles.

Other example embodiments of the present invention are directed to a control arrangement to control an actuator such as that described above, shown in the figures and as claimed. Certain approaches for effecting such control are exemplified in the figures and are applicable, for example, to implementation with personal vehicles.

Turning now to the Figures, FIG. 1 shows a mechanical drive arrangement 100, according to another example embodiment of the present invention. FIGS. 2-21 show side views of a mechanical drive arrangement 100 at various positions as operated and arranged in connection with example embodiments.

The arrangement 100 includes a rotational power source (represented by 17) that drives a worm 3 that is coupled to turn a worm gear 4 that is rotatably engaged to a shaft 20. A shaft or pin-type device 6 is attached to the worm gear 4 and engaged to a slot 19 (see FIG. 3) in a latch 7. The slot 19 (see FIG. 3) includes a vertical portion 23 and a curved portion 24 that is concentric with the worm gear 4 and its shaft 20. The latch 7 is engaged for sliding or translating, such as into a track that may be formed by a case 1 or another constraining feature, and/or a track in a cover 2 or other constraining feature. A limit switch 12 is positioned relative the latch 7 and generates an output that is used to stop the rotational power source 17 in response to a tab 25 on the latch contacting the limit switch when at a limit position. Correspondingly, reverse movement of the latch 7 to a reverse limit position is detected via a limit switch 11, which is also used to stop the rotational power source 17.

Figure 2:
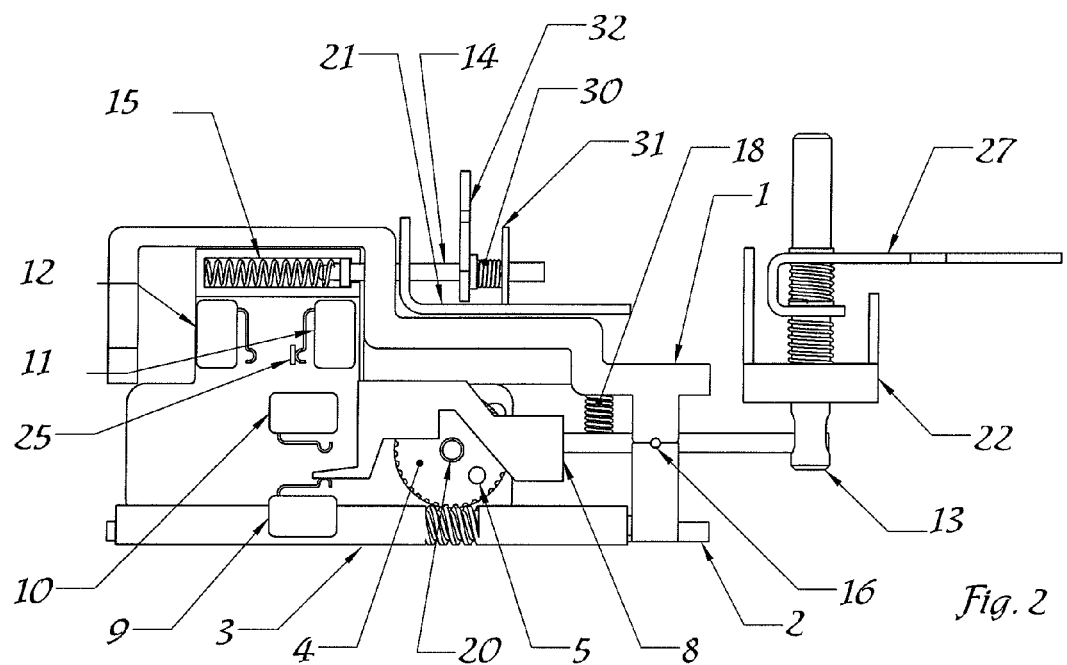
Figure 3:
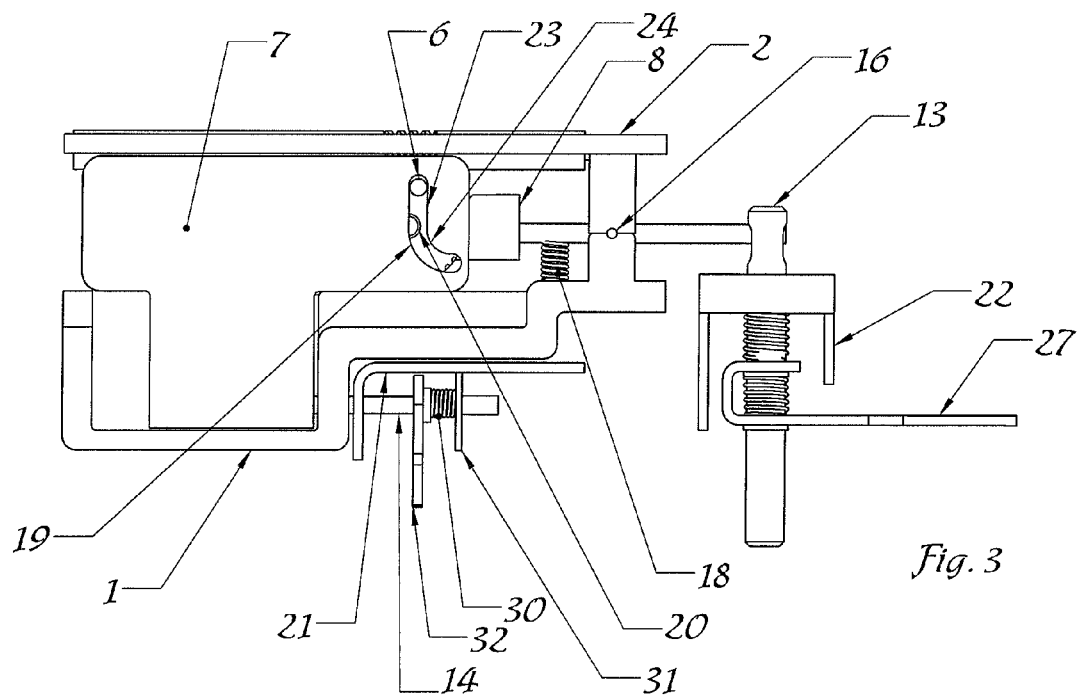

Referring to FIG. 1 and corresponding side views in FIG. 2 and FIG. 3, a spring 15 is coupled to the latch 7 and a shaft 14, which is engaged in a housing 21 (i.e., for sliding). Another spring 30 is coupled to the shaft 14 and a fixed portion 31 of the housing 21. A distal end of the shaft 14 is coupled to an engagement piece 32 for engaging and disengaging drive components. The movement of the latch 7 facilitates the movement of the shaft 14, via springs 15 and 30 and the housing 21, to position the engagement piece 32.

The worm gear 4 also drives another shaft or pin-type device 5 attached to a side of the worm gear that is opposite the shaft or pin-type device 6. The shaft or pin-type device 5 revolves about the shaft 20 (i.e., as the shaft or pin-type device 6 engages the slot 19) and engages the body of a rocker arm 8. The rocker arm 8 is engaged to the case 1 and cover 2 or other suitable constraining feature, by way of a fulcrum 16, and further coupled to a shaft 13. A tensioning spring 18 applies tension to the rocker arm 8. The shaft or pin-type device 5 is thus arranged to contact and rotate the rocker arm 8 about the fulcrum 16 and cause movement of the shaft 13. The shaft 13 slides in a housing 22 to move and, for example, cause the shifting of a differential gear case between and unlocked mode and a locked mode via locking arm 27. A limit switch 10 is responsive to contact by the rocker arm 8 by causing the rotational power source 17 to stop. For reverse movement, spring 18 pushes the rocker arm 8 back to a point where it contacts a limit switch 9.

In certain embodiments, freewheeling or dwell stages of operation of the arrangement 100 are modified or eliminated. These approaches may be carried out, for example, in accordance with one or more other example embodiments as described herein. For instance, the arrangements and related operation shown in one or more of FIGS. 10-21 may be implemented in lieu of and/or in addition to that shown in FIG. 1 and described above. These figures are discussed in greater detail below.

Operation of the arrangement 100 is carried out in a variety of manners, depending upon the application and the operation of that application. In one embodiment, the arrangement 100 is engaged as follows to engage two-wheel drive and four-wheel drive operational states of a vehicle. To initiate movement from a first position (position 1) as characterized in FIG. 2 and FIG. 3, to a second position (position 2) as characterized in FIG. 4 and FIG. 5, an electronic command is sent to the rotational power source 17, which drives the worm 3 to turn the worm gear 4, which rotates about the shaft 20. Such an electronic command may emanate from, for example, a user interface such as a push button or switch engaged by an operator of the vehicle.

The shaft or pin-type device 6 moves in the vertical portion 23 of the slot 19 in the latch 7 to push the latch along a track in the case 1 and/or cover 2. This movement of the latch 7 continues until the pin 6 reaches the curved portion 24 of the latch, where movement stops (i.e., due to the concentricity of the curved portion 24 relative to the worm gear 4). The limit switch 12 is activated at this position and generates a signal to stop the rotational power source 17. This movement of the latch 7 facilitates the movement of the shaft 14, sliding in the housing 21, and engagement piece 32 to shift a differential gear case from 2-wheel drive to 4-wheel drive. This completes the movement from position 1 to position 2.

Figure 4:
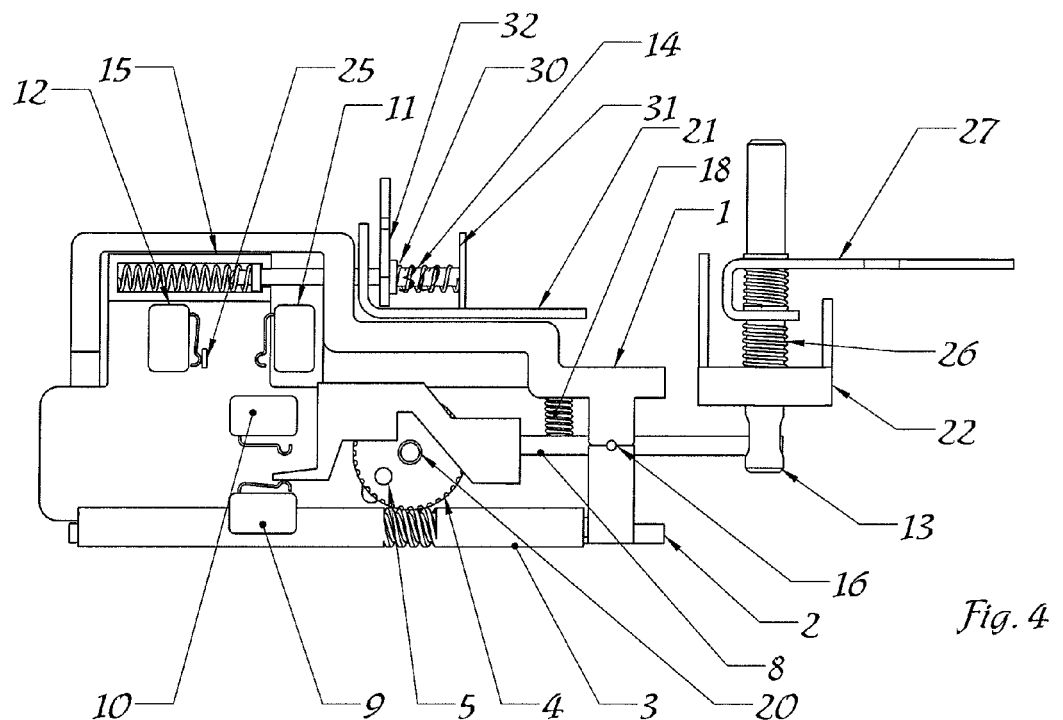
Figure 5:
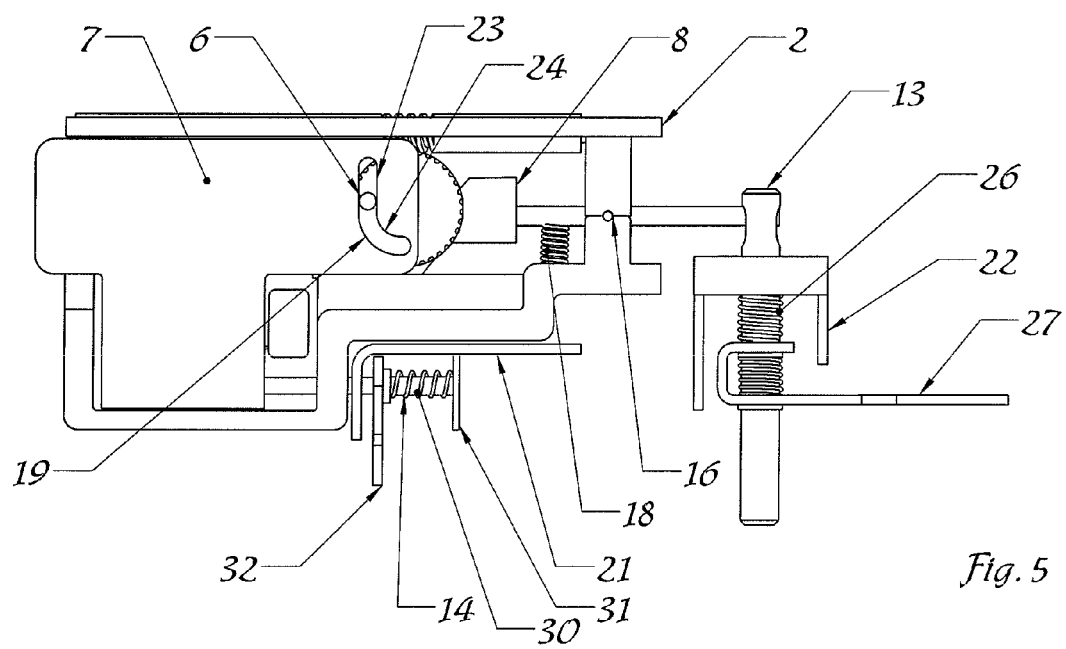
Figure 6:
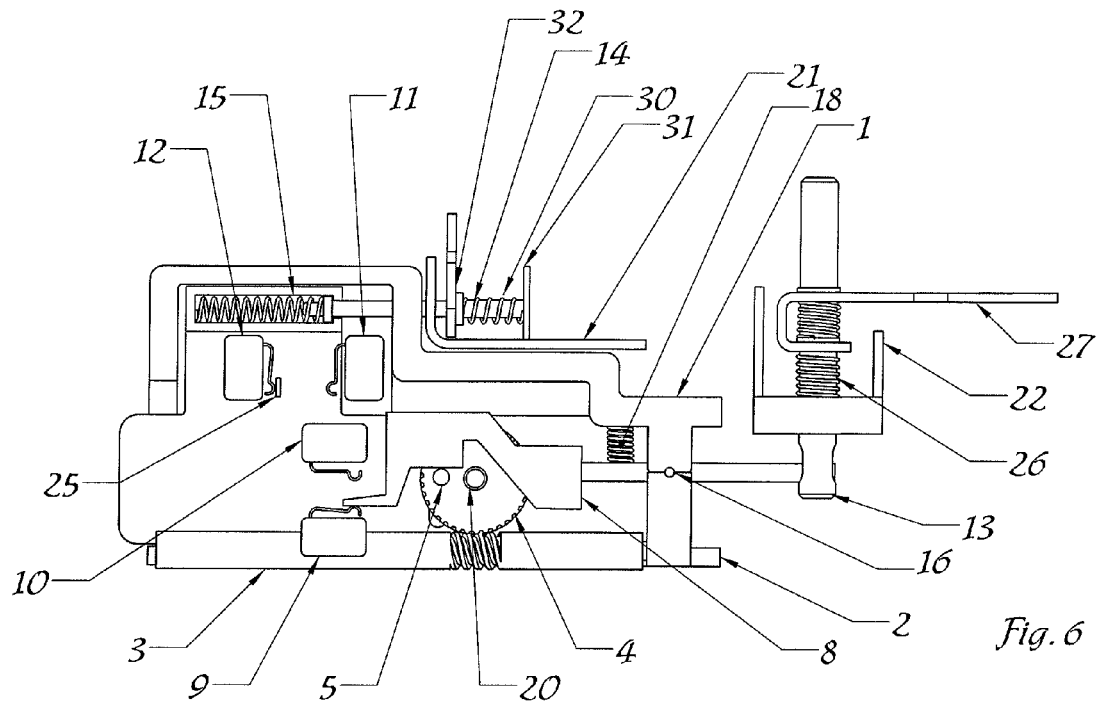
Figure 7:
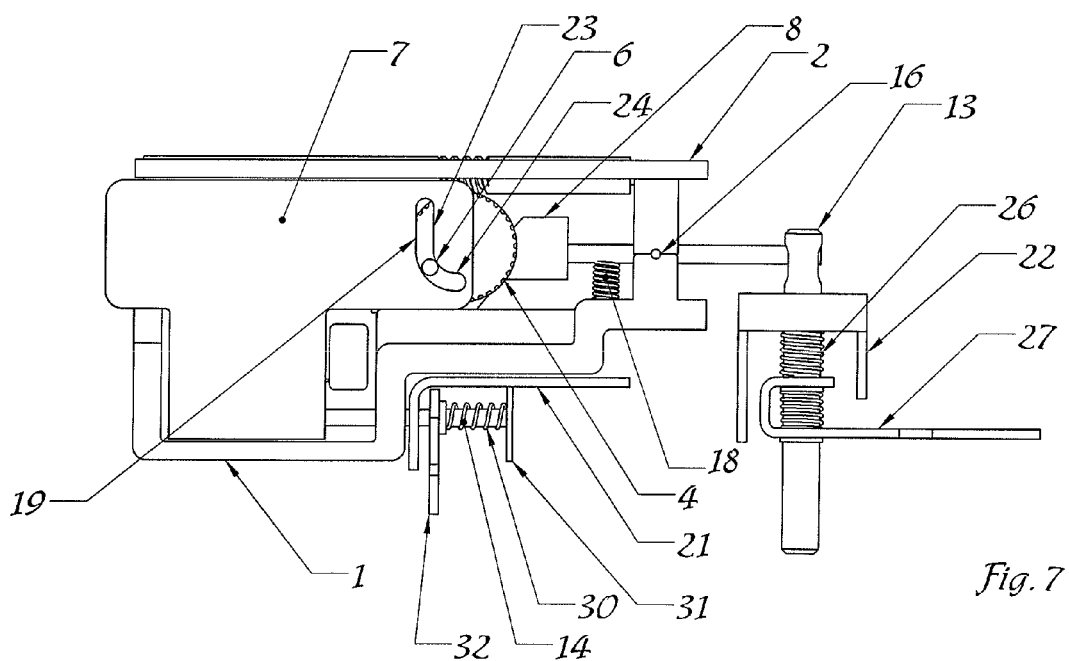

For movement from position 2 as shown in FIG. 4 and FIG. 5, to a dwell position as shown in FIG. 6 and FIG. 7, and subsequently to a third position (position 3) as shown in FIG. 8 and FIG. 9, the rotational power source 17 drives the worm 3 in the same direction as in the above description starting at the limit position of the movement of the latch 7 (against limit switch 12). The worm movement turns the worm gear 4, which drives the shaft or pin-type device 5 attached to the opposite side of the worm gear. The shaft or pin-type device 5 revolves freely about the shaft 20 as the shaft or pin-type device 6 revolves about the shaft 20 in the curved portion 24 of the slot 19, thus holding the latch 7 in its limit position (and the tab 25 against the limit switch 12). This freewheeling or dwell condition continues until the shaft or pin-type device 5 contacts the body of the rocker arm 8. In some applications, the freewheeling or dwell is eliminated, with the shaft or pin-type device 5 contacting the body of the rocker arm 8 as the shaft or pin-type device 6 enters the curved portion 24 of the slot 19.

As the worm gear 4 continues to turn, the shaft or pin-type device 5 contacts the rocker arm 8 and rotates the rocker arm about the fulcrum 16 as shown in FIG. 8 and FIG. 9. This rotation causes the shaft 13 to slide in the housing 22 and shift a differential gear case from unlocked to locked mode. During this rotation, the shaft or pin-type device 6 continues to revolve about the shaft 20, engaging the worm gear 4 within the curved portion 24 of the slot 19 and holding the latch 7 in its limit position (i.e., with the tab 25 against limit switch 12). When the movement is complete, the rocker arm 8 contacts the limit switch 10, which stops the rotational power source 17. This completes the movement from position 2 to position 3.

Movement from position 3 to position 2 is carried out by reversing the movement from position 2 to position 3. At least one spring, including spring 18 (and, e.g., spring 26), pushes the rocker arm 8 back to a point where it contacts the limit switch 9. Movement from position 2 to position 1 is a reversal of the movement from position 1 to position 2, with rotation initiated at position 2 and continuing until the latch 7 contacts the limit switch 11 (at position 1).

Referring again to FIGS. 1-9, various embodiments involve the use of different components to carry out similar functionality. For example, in some embodiments, the location of the shafts or pin-type devices 5 and 6 is varied to drive slidable shafts oriented differently than those shown. In other embodiments, machine components other than slidable shafts are moved using this approach. As another example, in certain embodiments, one or more other devices and/or methods are used to detect the completion of movement, in alternative to and/or in addition to the limit switches 9-11. For example, referring to FIG. 1, a motion sensor may be used to detect motion characteristics of the latch 7. A proximity sensor may be used in a manner similar to that in which the limit switch 11 is used to detect that the latch 7 is in a certain proximity. A position sensor may be used to determine the position of the limit switch, relative to one or more positions. These and other approaches or variations, relating to geometry, physical functionality and other characteristics are used in connection with various example embodiments.

In the following discussion of figures, various embodiments and implementations refer back to one or more of the above-discussed figures and related drawings. In some instances, similar labeling is used in connection with features shown in the figures that are similar to those shown in one or more of the figures described above. Where appropriate for brevity, discussion of such features is generally omitted in the following discussion of figures, with the understanding that the above discussion may be selectively applied henceforth.

As characterized above, actuator movement may involve a dwell between other operations as shown, for example, in FIG. 6 and in FIG. 7, with other embodiments directed to an approach wherein the dwell is modified, eliminated, and/or where dwell could be considered as a reverse dwell. Other embodiments involve operation of different movements for actuation, such as those shown in and described in connection with FIGS. 2-9, where movement between the indicated positions begin and end under relatively different conditions to suit particular needs.

Figure 10:
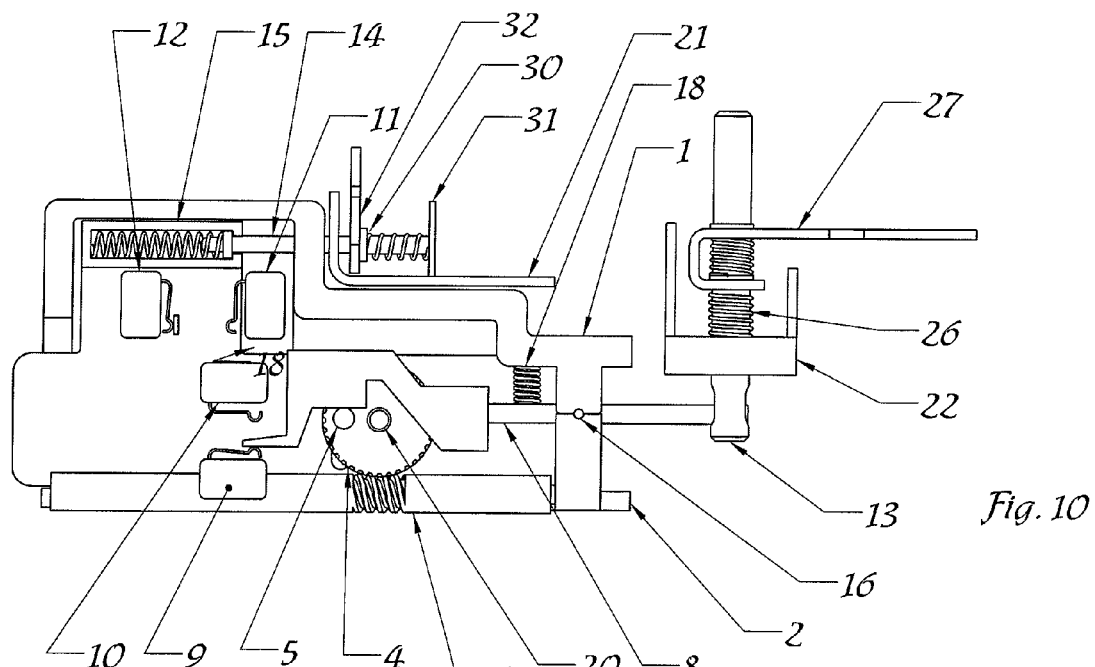
FIG. 10 shows a first side view of an actuator arrangement operated without dwell, according to another example embodiment of the present invention.
Figure 11:
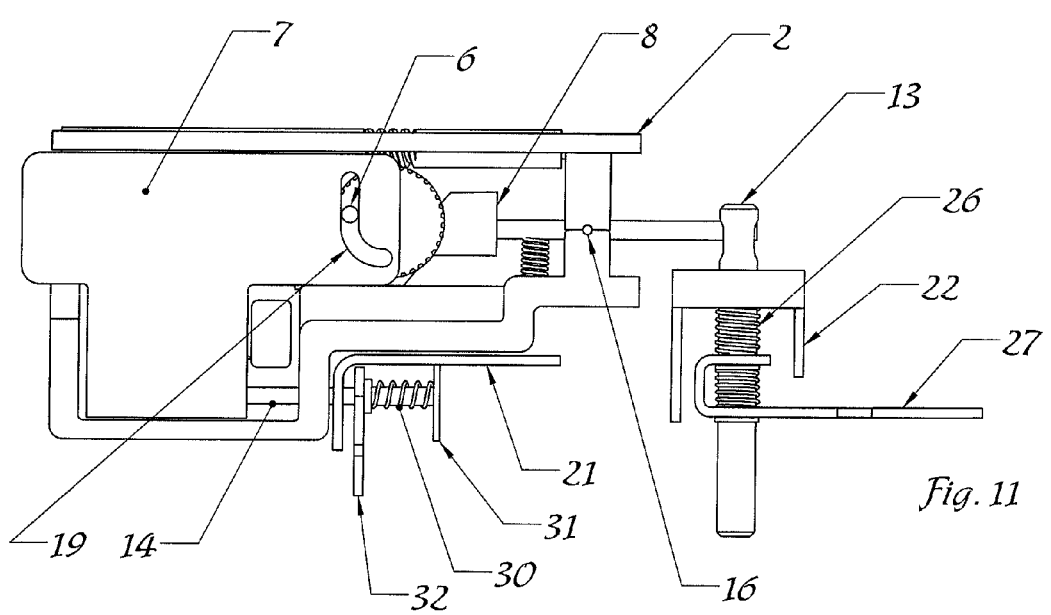
FIG. 11 shows another side view of an actuator arrangement operated without dwell as in FIG. 10, according to another example embodiment of the present invention.

In this context, FIG. 10 and FIG. 11 show (opposite) side views of a position involving (about) no dwell in an actuator mechanism such as the actuator mechanism 100 in FIG. 1 in a second position as described above, with modifications to facilitate indicated dwell characteristics. As the worm 3 is driven, the worm movement turns the worm gear 4, which drives the shaft or pin-type device 5 attached to the opposite side of the worm gear. The shaft or pin-type device 5 contacts the body of the rocker arm 8 as the shaft or pin-type device 6 is at the curved portion 24 of the slot 19. By way of reference, the position characterized in FIG. 10 and in FIG. 11 can be referred to a "Position 2A" relative to the above discussion. As such, this Position 2A can be implemented with the approaches shown in FIG. 2 through FIG. 9 as an alternate to the indicated second position ("Position 2") having opposing views shown in FIG. 4 and FIG. 5.

Figure 12:
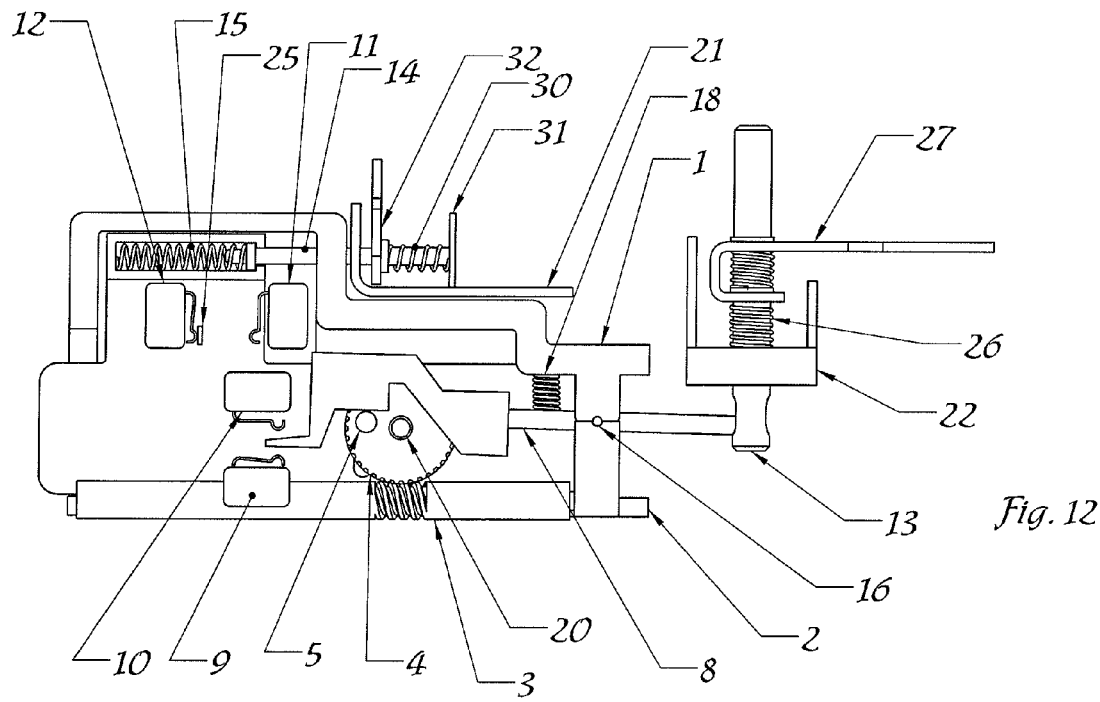
FIG. 12 shows a first side view of a second actuator position where movement to a third position is begun before the second position is reached, according to another example embodiment of the present invention.
Figure 13:
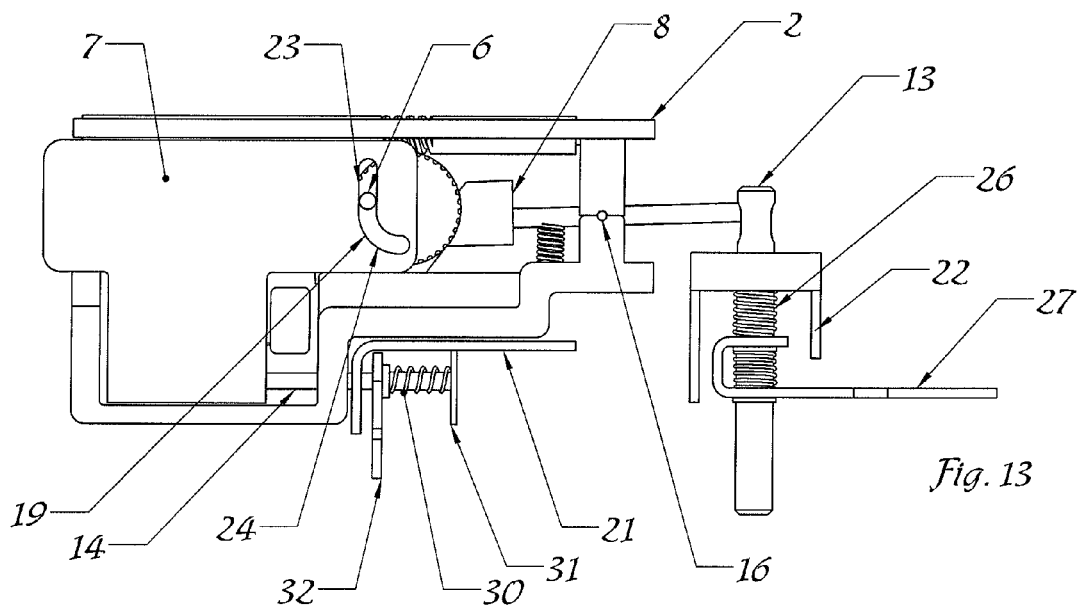
FIG. 13 shows another side view of the second position in FIG. 12, according to another example embodiment of the present invention.

FIG. 12 and FIG. 13 respectively show opposite side views relating to actuator movement from one position to another position, where movement between positions is begun before one of the positions is reached. Similar to the above approaches for positions 2 and 2A, as the worm 3 is driven, the worm movement turns the worm gear 4, which drives the shaft or pin-type device 5 attached to the opposite side of the worm gear. The shaft or pin-type device 5 contacts the body of the rocker arm 8 earlier, to effect movement towards a third position (position 3), relative to rocker arm 8, shaft 13 and the related mechanisms including locking arm 27. This approach is applicable to movement to a third position that is initiated before a second position is reached, relative to the approach described above in connection with FIG. 4 and FIG. 5 and, accordingly, is referenced as a "Position 2B" by way of example.

Effectively and as evident in FIGS. 10-13, the positions of the shaft or pin-type devices 5 and 6, the curved portion 24 and related items (i.e., rocker arm 8) are positioned and shaped to effect the characteristics of any dwell stage, such as the length of dwell or lack thereof. In this context, the positioning of the shaft or pin-type devices 5 and 6, the curved portion 24, their geometries and relative positioning, are modified to achieve different operational characteristics to suit different applications as needed. These approaches can be carried out with the general operation of the actuator maintained.

In other example embodiments, movement direction is reversed or otherwise altered (i.e., relative to the above figures) with relatively common results achieved based upon relative positioning of the indicated actuator components and the related drive engagement. In accordance with some of these example embodiments, FIGS. 14-19 show side views (with alternating opposite sides) of different positions with reversed action and/or motion.

Figure 14:
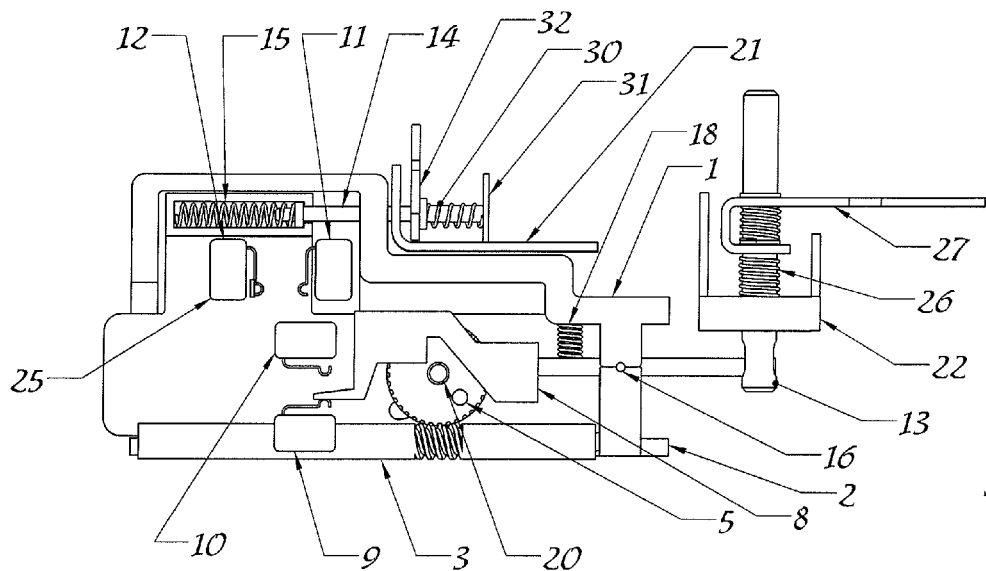
FIG. 14 shows a first side view of a first actuator position with reversed action, according to another example embodiment of the present invention.
Figure 15:
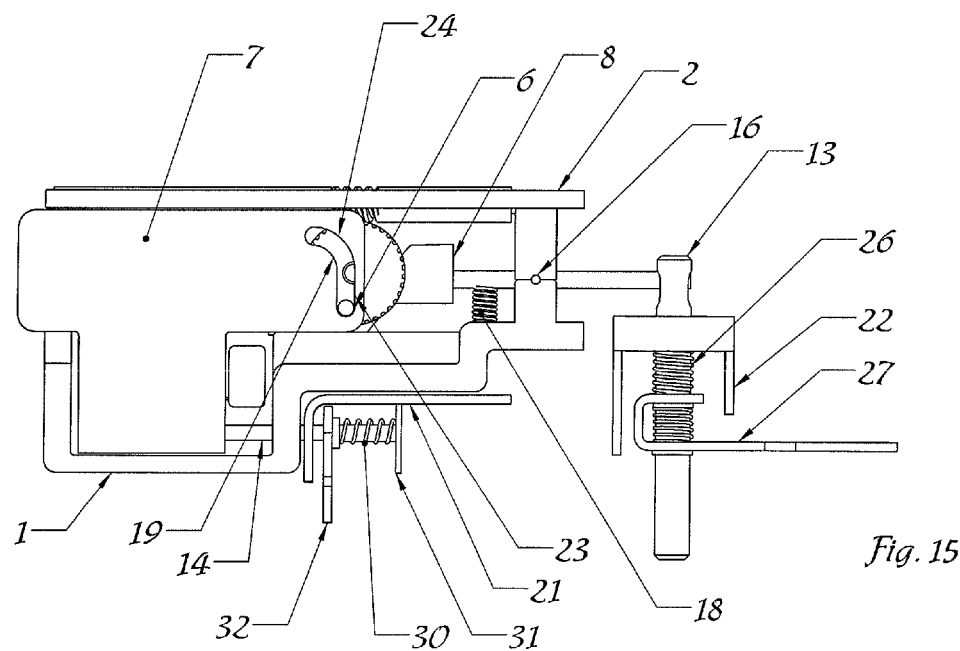
FIG. 15 shows another side view of the first position in FIG. 14 using reverse motion, according to another example embodiment of the present invention.
Figure 16:
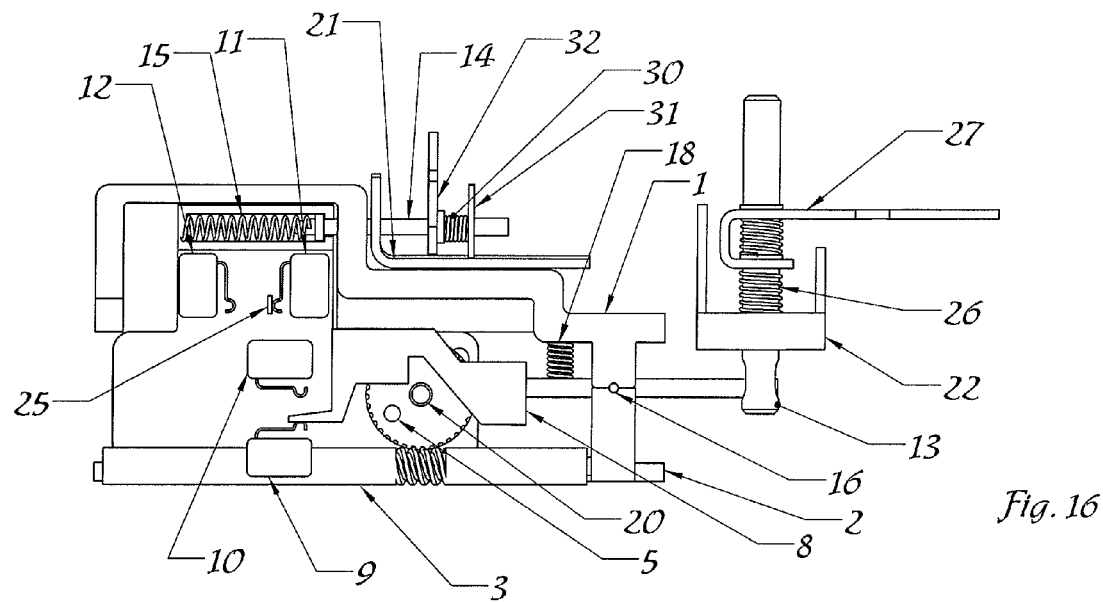
FIG. 16 shows a first side view of a second actuator position with reversed action, according to another example embodiment of the present invention.
Figure 17:
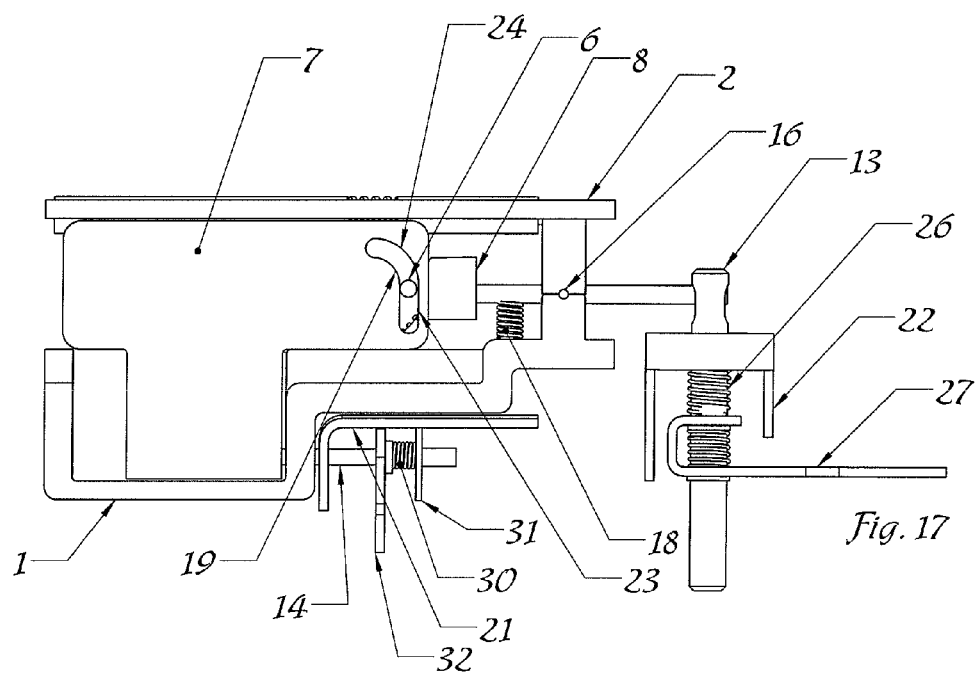
FIG. 17 shows another side view of the second position in FIG. 16 using reverse motion, according to another example embodiment of the present invention.
Figure 18:
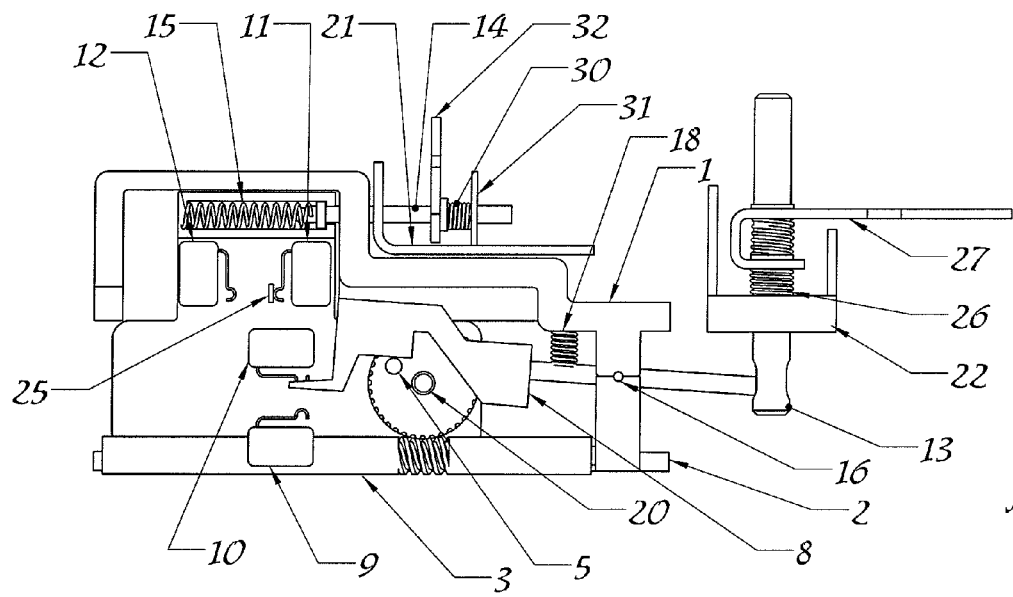
FIG. 18 shows a first side view of a third actuator position using reverse motion, according to another example embodiment of the present invention.
Figure 19:
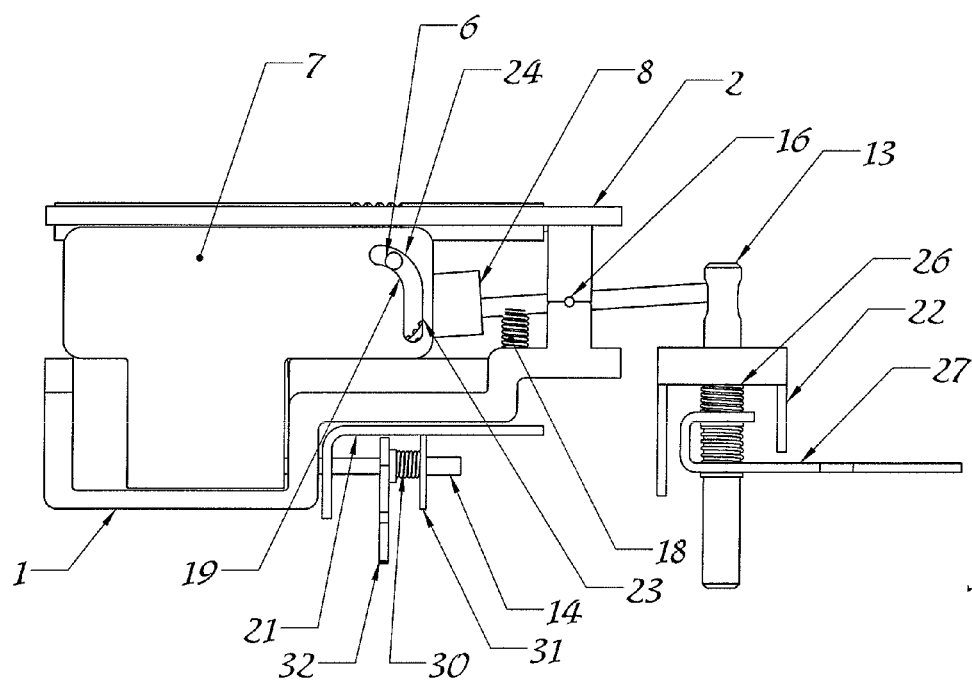
FIG. 19 shows another side view of the third position as shown in FIG. 18, according to another example embodiment of the present invention.

Beginning with FIGS. 14 and 15, opposite side views are shown of a first position with reversed action and related motion, relative to the above-described first position in FIGS. 2 and 3 (and correspondingly labeled "Position 1R"). FIGS. 16 and 17 show opposite side views of a second position with reversed action and related motion, relative to the above-described second position in FIGS. 4 and 5 (and correspondingly labeled "Position 2R"). FIGS. 18 and 19 show opposite side views of a third position using reverse action and related motion, relative to the above-described third position in FIGS. 8 and 9 (and correspondingly labeled "Position 3R").

Operation of the shown actuator arrangements in FIGS. 14-19 is similar to that as described above and in the respectively-referenced figures. Generally, the worm 3 is driven to turn the worm gear 4, which rotates about the shaft 20. The shaft or pin-type device 6 moves in the slot 19 in the latch 7 to push the latch. Movement is relative to the positioning of the shaft or pin-type device 6 relative to the slot 19 and their respective placement and geometry. When the shaft or pin-type device 5 is rotated to contact the rocker arm 8, the rocker arm is rotated about the fulcrum 16 (see FIGS. 18 and 19). This rotation causes the shaft 13 to slide in the housing 22 and shift a differential gear case between unlocked and locked modes. The limit switches are activated as shown, using an approach that is similar to the approach described above with FIGS. 2-9, to control the movement of the actuator. Reverse movements (from position 3R to position 2R, and subsequently from position 2R to position 1R) are carried out similarly, with springs pushing the rocker arm 8. The reverse action and motion approaches shown in FIGS. 14-19 can also be implemented with various stages of dwell, lack thereof or early movement between positions as described, for example, in FIGS. 10-13.

Figure 20:
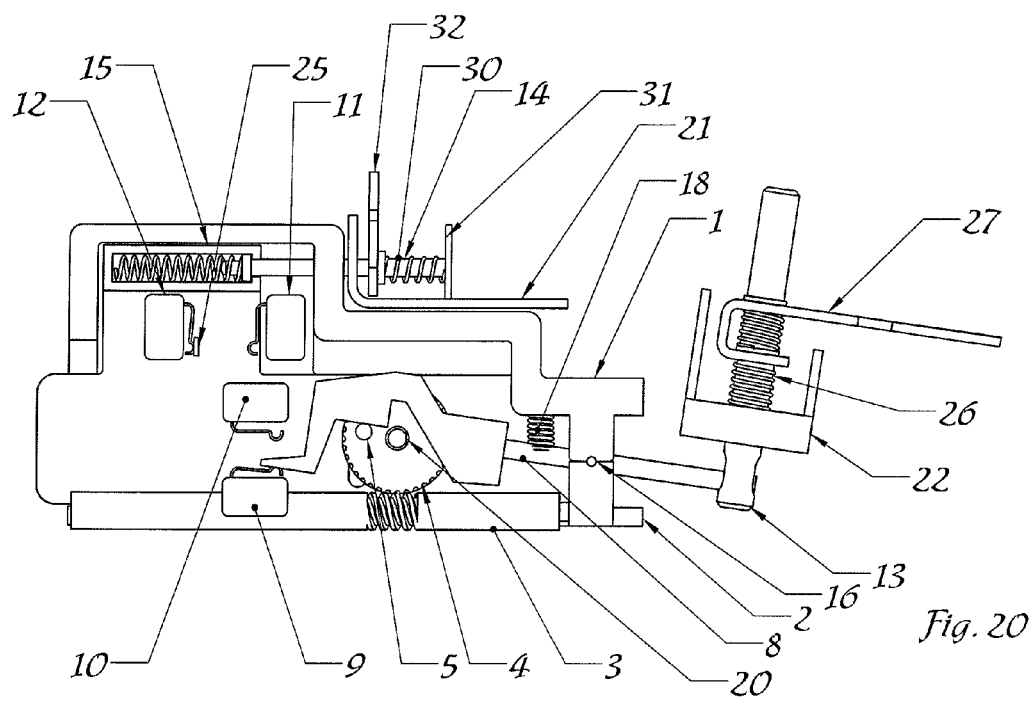
FIG. 20 shows a first side view of an actuator arrangement with an angled engagement, according to another example embodiment of the present invention.
Figure 21:
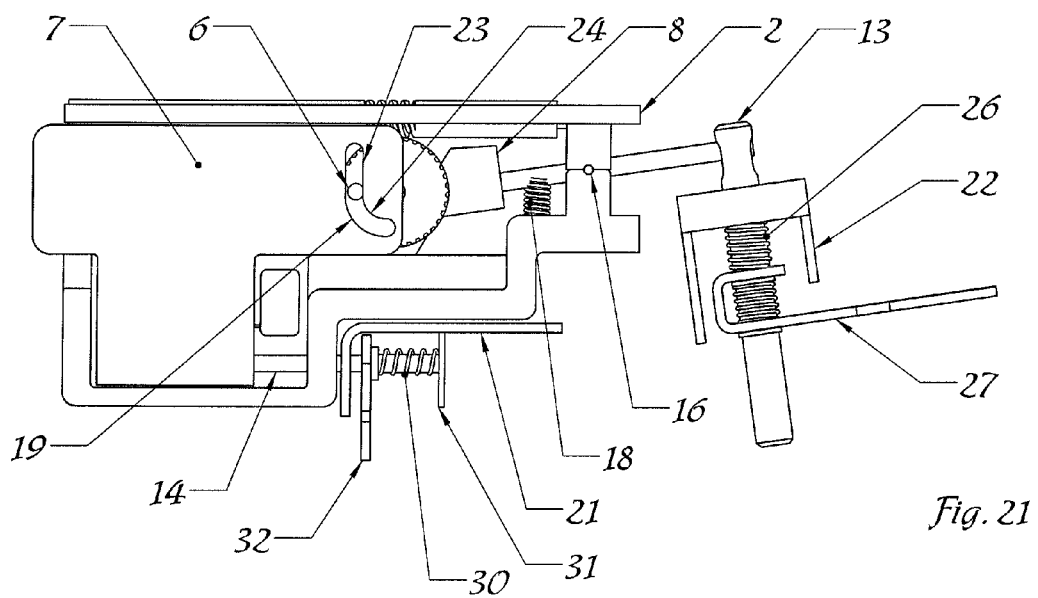
FIG. 21 shows another side view of the actuator arrangement in FIG. 20, according to another example embodiment of the present invention.

FIGS. 20 and 21 show opposite side views of an actuator arrangement that engages and disengages a drive system, according to another example embodiment of the present invention. The actuator arrangement shown in FIGS. 20 and 21 may be implemented in accordance with one or more example embodiments as described above, and as shown in one or more of FIGS. 1-19. The shaft 13, spring 26, housing 22 and locking arm 27 are angled, relative to the remaining portions of the actuator arrangement (e.g., compared to FIGS. 2 and 3 above). Other embodiments are directed to similar approaches, with varying degrees of relative angle, to suit particular needs.

Figure 22:
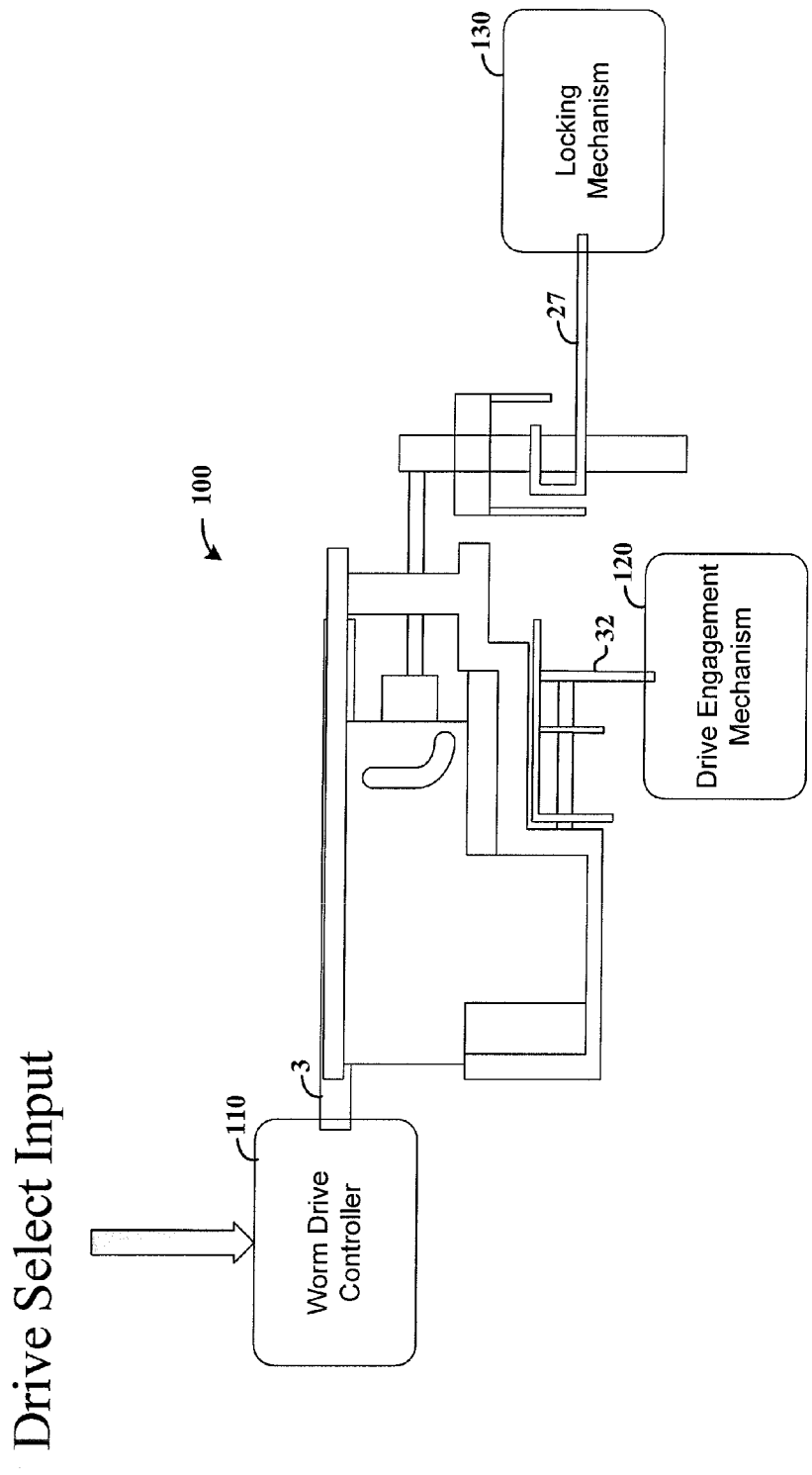
FIG. 22 shows an actuator arrangement coupled to external input and drive components, according to another example embodiment of the present invention.

FIG. 22 shows the actuator arrangement 100 of FIG. 1 coupled to external input and drive components, according to another example embodiment. Aspects of the arrangement in FIG. 22 may also be implemented in connection with one or more of the other figures and arrangements, to suit different embodiments. As discussed above, the worm 3 can be driven in a variety of manners, and is shown here coupled to a worm drive controller 110 that applies a rotational force to the worm in response to a drive select input signal (i.e., to shift between two-wheel drive and four-wheel drive). The engagement piece 32 engages with an engagement mechanism 120 that controls the engagement of a drive gear such as a four-wheel drive gear for a personal vehicle. The locking arm 27 engages with a locking mechanism 130 that locks drive gears, such as for locking a four-wheel drive gear in an engaged position. Each of the worm drive controller 110, drive engagement mechanism 120 and locking mechanism 130 are represented generally in block form, and as such are applicable to implementation with a multitude of different types of controllers, engagement and locking mechanisms for a variety of different vehicles.

Figure 23:
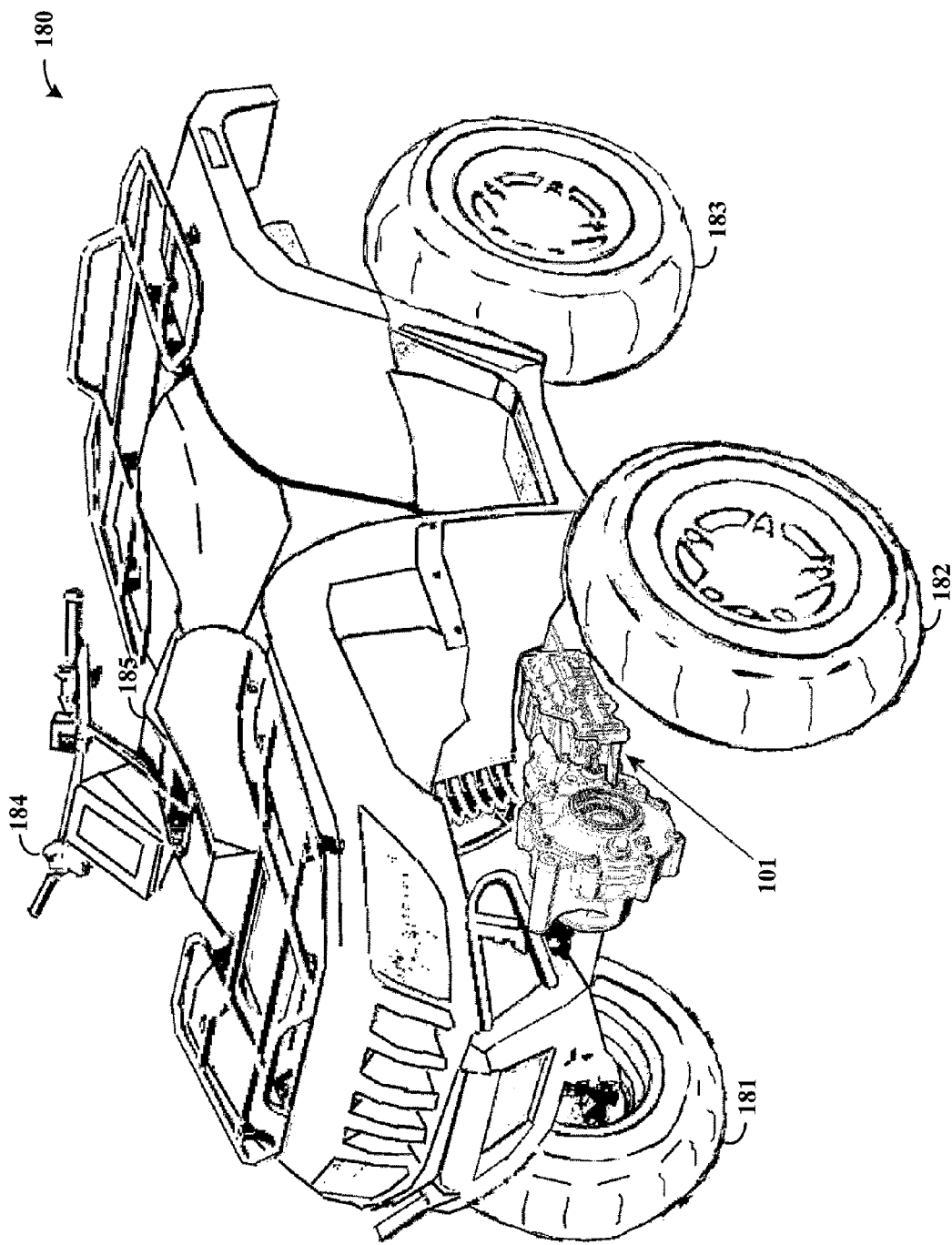
FIG. 23 shows a vehicle drive arrangement, according to another example embodiment of the present invention.
Figure 2A:
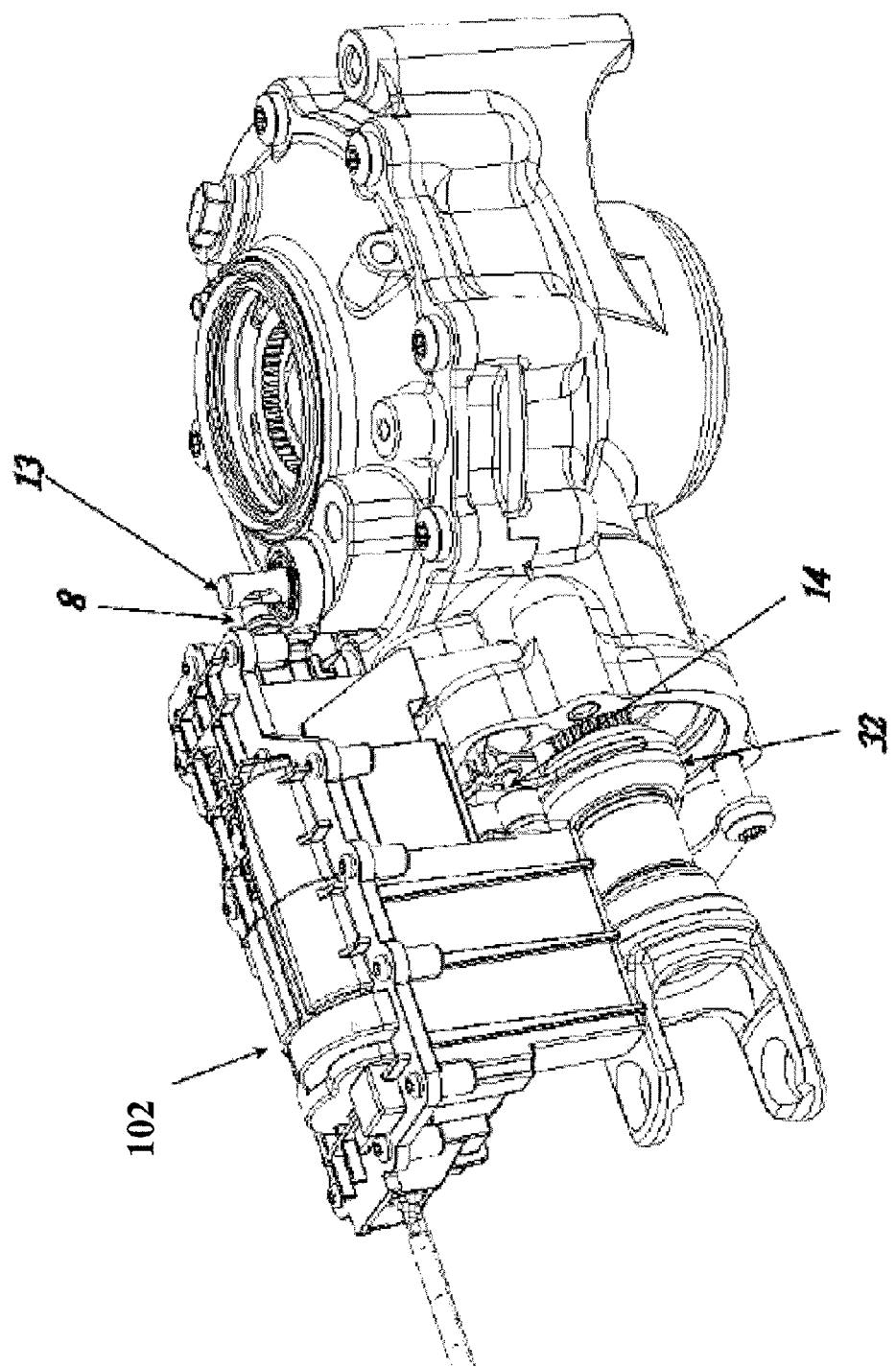

FIG. 23 shows an example embodiment involving an all-terrain vehicle 180, according to another example embodiment of the present invention. The vehicle 180 includes an actuator arrangement 101, shown in a cut-away view, that controls drive engagement for the front wheels (181, 182) and rear wheels (183, only one wheel shown) of the vehicle 180. The actuator arrangement 101 may be implemented using the actuator arrangement 100 as described in one or more embodiments above, with the locking arm 27 used to engage and/or disengage two-wheel drive (i.e., rear wheels including wheel 183) and four-wheel drive (i.e., with all wheels including wheels 181-183). Control inputs can be located at an accessible position, such as at handlebars 184 or console 185, for controlling the power source (represented by 17) to drive worm 3 and accordingly control the engagement and disengagement of two-wheel and four-wheel drive. For general information regarding vehicles with drive engagement, and for specific information regarding vehicles and vehicle systems to which this and/or other example embodiments can be applied, reference may be made to the following U.S. patents (incorporated herein by reference): U.S. Pat. Nos. 7,343,998; 7,243,564; 7,018,317; and 6,904,992. In addition, while shown with four wheels, the vehicle 180 may be operated with a track system that is engaged with wheels or a wheel-like drive arrangement.

FIG. 24 shows an actuator 102 attached to a differential with mechanical connections, according to another example embodiment of the present invention. The actuator 102 may be implemented using the actuator 100 as shown in one or more of FIGS. 1-22, with rocker arm 8, shaft 13, shaft 14 and engagement piece 32 (to which shaft 14 is connected) shown by way of example. Operation of these components can be carried out in a manner similar to that described above with FIGS. 1-22. In addition, the actuator 102 may be implemented as actuator 101 in the vehicle 180 shown in FIG. 23, as part of a differential for selectively engaging and driving the wheels 181-183.

While the present invention has been described above, in the claims that follow and shown (and described) in the figures, those skilled in the art will recognize that many changes may be made thereto without departing from the spirit and scope of the present invention. Such changes may include, for example, interchanging materials, such as replacing using different materials for the shown components. Other changes may involve the control of the actuator in one or more manners, some of which are exemplified herein with reverse movement, different dwell conditions, different relative positioning and other characteristics. Still other changes involve the implementation of the shown actuator arrangements with a different vehicles, such as all-terrain vehicles, motorcycles or snowmobiles (e.g., similar to the approach shown in FIG. 23). These and other approaches characterize aspects of the present invention, including those set forth in the claims.

What is claimed is:

1. An actuator arrangement comprising:
a latch configured and arranged to selectively engage a vehicle drive arrangement with a rotational power source relative to a translational position of the latch corresponding to engaged and disengaged states for driving a vehicle, the latch having a slot therein;

a rocker arm configured and arranged to selectively lock the engagement of the vehicle drive arrangement to separate drive components of the vehicle relative to a rotational position of the rocker arm about a fulcrum;

a rotatable gear that rotates in response to a gear input;

a first pin connected to the rotatable gear and extending into the slot in the latch and configured and arranged to engage and move the latch in engaged and disengaged states as the rotatable gear rotates;

a second pin connected to the rotatable gear to engage and rotate the rocker arm about the fulcrum as the rotatable gear rotates; and a sensor arrangement to sense the position of at least one of the latch and the rocker arm for controlling the rotation of the rotatable gear for selective engagement and locking of the vehicle drive arrangement.

2. The arrangement of claim 1, wherein the first pin rotates about a rotational axis of the rotatable gear, the slot in the latch includes a concentric portion that is concentric about the rotational axis, wherein movement of the first pin in the concentric portion of the slot does not cause translation of the latch, and the slot in the latch includes a non-concentric portion that is not concentric about the rotational axis, wherein movement of the first pin in the non-concentric portion of the slot causes translation of the latch to effect the selective engagement of the vehicle drive arrangement.

3. The arrangement of claim 1, wherein the first pin rotates about a rotational axis of the rotatable gear, the slot in the latch includes a concentric portion that is concentric about the rotational axis, wherein movement of the first pin in the concentric portion of the slot does not cause translation of the latch, the slot in the latch includes a non-concentric portion that is not concentric about the rotational axis, wherein movement of the first pin in the non-concentric portion of the slot causes translation of the latch to effect the selective engagement of the vehicle drive system, and the rotatable gear and the pins are arranged to engage and lock the vehicle drive arrangement by rotating the first pin in the non-concentric portion of the slot for translating the latch to engage the drive, and after engagement of the drive, rotating second pin against the rocker arm to rotate the rocker arm for locking the engagement of the drive, during which rotation of the second pin the first pin rotates in the concentric portion of the slot.

4. The arrangement of claim 1, wherein the first pin rotates about a rotational axis of the rotatable gear, the slot in the latch includes a concentric portion that is concentric about the rotational axis, wherein movement of the first pin in the concentric portion of the slot does not cause translation of the latch, the slot in the latch includes a non-concentric portion that is not concentric about the rotational axis, wherein movement of the first pin in the non-concentric portion of the slot causes translation of the latch to effect the selective engagement of the vehicle drive arrangement, and the rotatable gear and the pins are arranged to unlock and disengage the vehicle drive arrangement by rotating the second pin to allow the rocker arm to rotate for unlocking the engagement of the drive, during which rotation of the second pin the first pin rotates in the concentric portion of the slot, and after unlocking the engagement of the drive, rotating the first pin in the non-concentric portion of the slot for translating the latch to disengage the drive.

5. The arrangement of claim 1, wherein the rotatable gear and the pins are arranged to engage and lock the vehicle drive arrangement by rotating the first pin for translating the latch to engage the vehicle drive arrangement with the rotational power source for driving a vehicle, in response to a rotational input applied to teeth of the rotatable gear by teeth of a worm, and after engagement of the drive, rotating the second pin against the rocker arm to rotate the rocker arm for locking the engagement of the drive to the separate drive components of a vehicle.

6. The arrangement of claim 1, wherein the rotatable gear and the pins are arranged to unlock and disengage the vehicle drive arrangement by rotating the second pin to allow the rocker arm to rotate for unlocking the engagement of the vehicle drive arrangement with the separate drive components of a vehicle connected by the vehicle drive arrangement, and after unlocking the engagement of the drive, rotating the first pin for translating the latch to disengage the drive from a rotational power source.

7. The arrangement of claim 1, wherein the first pin rotates with the gear in a portion of the slot that does not cause the latch to move during rotation of the second pin with the gear to engage and rotate the rocker arm.

8. The arrangement of claim 1, wherein, during rotation of the first pin to move the latch, the second pin does not rotate the rocker arm about the fulcrum.

9. The arrangement of claim 1, wherein the rocker arm is configured and arranged to move from a locked state, in which the vehicle drive arrangement is engaged and locked for locking separate driven components of the vehicle to one another, to an unlocked state, in which the vehicle drive arrangement is unlocked for unlocking separate driven components of the vehicle from one another, in response to the second pin rotating away from the rocker arm.

10. The arrangement of claim 1, further including a spring arrangement coupled to the rocker arm to move the arm from a locked state, in which the vehicle drive arrangement is engaged and locked, to an unlocked state, in which the vehicle drive arrangement is unlocked, in response to the second pin rotating away from the rocker arm.

11. The arrangement of claim 1, wherein the rotatable gear rotates in a first direction for engaging the vehicle drive arrangement via the latch and for locking the engagement of the vehicle drive arrangement via the rocker arm, and the rotatable gear rotates in an opposite direction for unlocking the engagement of the vehicle drive arrangement with separate driven components via the rocker arm and for disengaging the vehicle drive arrangement from the rotational power source via the latch.

12. The arrangement of claim 1, further including a spring arrangement to apply the rocker arm in an unlocked state in which the engagement of the vehicle drive system is unlocked, and wherein the second pin engages the rocker arm to rotate the rocker arm against the spring arrangement into a locked state in which the engagement of the vehicle drive system is locked.

13. The arrangement of claim 1, wherein the first and second pins are located on opposite surfaces of the rotatable gear.

14. The arrangement of claim 1, wherein the slot has a width that is about equal to a diameter of the first pin.

15. The arrangement of claim 1, wherein the sensor arrangement
senses the positioning of the latch in an engaged vehicle drive state, senses the position of the rocker aim in a locked engagement state, and senses the position of the rocker arm in an unlocked engagement state, and
controls the rotation of the rotatable gear for selective engagement and locking of the vehicle drive arrangement in response to the sensed positions of the latch and the rocker arm.

16. A drive system for selectively operating a vehicle in two-wheel drive, four-wheel drive or locked four-wheel drive states, the system comprising:
a differential to couple power from a power source to drive wheels when engaged in four-wheel drive operation;
an actuator arrangement including
a latch configured and arranged to selectively engage the differential with the power source, relative to a translational position of the latch corresponding to engaged, disengaged and locked states for respectively driving the vehicle in the two-wheel drive, four-wheel drive and locked four-wheel drive states, the latch having a slot therein,
a rocker arm configured and arranged to selectively lock the engagement of the differential, to couple the rotation of separate driven wheels of the vehicle to one another for four-wheel locked drive operation, relative to a rotational position of the rocker arm about a fulcrum,
a rotatable gear that has gear teeth about a perimeter of the gear and that rotates in response to a gear input to the teeth,
a first pin connected to the rotatable gear and extending into the slot in the latch and configured and arranged to engage and move the latch between the engaged and disengaged states as the rotatable gear rotates,
a second pin connected to the rotatable gear to engage and rotate the rocker arm about the fulcrum as the rotatable gear rotates, and
a sensor to sense the position of the latch for controlling the rotation of the rotatable gear for selective engagement and locking of the differential; and
a rotational power source coupled to control the rotation of the rotatable gear for selectively engaging and locking the differential for selectively operating the vehicle in two-wheel drive or four-wheel drive.

17. The system of claim 16, wherein the drive wheels are configured to engage with a surface to move the vehicle in response to the latch engaging the differential with the power source.

18. The system of claim 16, wherein the drive wheels are configured to engage with a track that engages a surface for moving the vehicle.

19. The system of claim 16, wherein the power source is an engine that drives two wheels in two-wheel drive operation and that is coupled to said drive wheels, via the actuator arrangement, to drive two additional wheels in four-wheel drive operation.

20. An all-terrain vehicle comprising:
an engine;
wheels that support and move the vehicle over a surface;
a differential to couple rotational power from the engine to the wheels when engaged in four-wheel drive operation;
an actuator arrangement including
a latch configured and arranged to selectively engage the differential with the engine to couple the rotational power to the wheels for driving the wheels in four-wheel drive operation, relative to a translational position of the latch, the latch having a slot therein,
a rocker arm configured and arranged to selectively lock the engagement of the differential relative to a rotational position of the rocker arm about a fulcrum to couple the rotation of the wheels driven in locked four-wheel drive operation,
a rotatable gear that rotates in response to a gear input,
a first pin connected to the rotatable gear and extending into the slot in the latch and configured and arranged to engage and move the latch between engaged and disengaged states for driving the vehicle in four-wheel drive as the rotatable gear rotates,
a second pin connected to the rotatable gear to engage and rotate the rocker arm about the fulcrum as the rotatable gear rotates, and
a sensor to sense the position of the latch for controlling the rotation of the rotatable gear for selective engagement and locking of the differential; and
a rotational power source coupled to control the rotation of the rotatable gear for selectively engaging and locking the differential for selectively operating the vehicle in two-wheel drive, four-wheel drive or locked four-wheel drive.

21. A two-stage actuator arrangement for operating a vehicle drive arrangement in a disengaged state, in an unlocked engaged state, and in a locked engaged state, the arrangement comprising:
a clutch-less latch coupled to selectively engage and disengage a vehicle drive arrangement with a rotational power source, relative to translational positions of the latch respectively corresponding to engaged states and a disengaged state for driving a vehicle, the latch having a slot therein;
a rocker arm to selectively lock the rotation of separate driven components of the vehicle, relative to a rotational position of the rocker arm about a fulcrum;
a rotatable gear having gear teeth about a perimeter of the gear and arranged to engage with teeth of an input worm, the rotatable gear being configured to rotate about an axis in response to a gear input applied to the gear teeth by the worm;
a first pin connected to the rotatable gear and extending into the slot in the latch to engage and move the latch between the engagement stage position and the disengagement stage position as the rotatable gear rotates;
a second pin connected to the rotatable gear to engage and rotate the rocker arm about the fulcrum as the rotatable gear rotates; and
a sensor arrangement to sense the position of at least one of the latch and the rocker arm for controlling the rotation of the rotatable gear for selective engagement and locking of the vehicle drive arrangement.

22. The arrangement of claim 21, wherein the clutch-less latch is configured to operate the vehicle drive arrangement in the disengaged state by disengaging the rotational power source from all driven components coupled via the two-stage actuator arrangement.

* * * * *

UNITED STATES PATENT AND TRADEMARK OFFICE
CERTIFICATE OF CORRECTION

| | | |
|---|---|---|
| PATENT NO. | : 8,316,981 B2 | Page 1 of 1 |
| APPLICATION NO. | : 12/521971 | |
| DATED | : November 27, 2012 | |
| INVENTOR(S) | : Nyberg et al. | |

It is certified that error appears in the above-identified patent and that said Letters Patent is hereby corrected as shown below:

In the Claims

Claim 15, Col. 11, line 9: "rocker aim" should read --rocker arm--.

Signed and Sealed this
Fourth Day of February, 2014

Michelle K. Lee
*Deputy Director of the United States Patent and Trademark Office*